United States Patent
Hatada

(10) Patent No.: US 9,207,438 B2
(45) Date of Patent: Dec. 8, 2015

(54) ZOOM LENS AND IMAGE PICK-UP APPARATUS HAVING THE SAME

(71) Applicant: CANON KABUSHIKI KAISHA, Tokyo (JP)

(72) Inventor: Takahiro Hatada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 13/664,829

(22) Filed: Oct. 31, 2012

(65) Prior Publication Data

US 2013/0107089 A1    May 2, 2013

(30) Foreign Application Priority Data

Nov. 1, 2011   (JP) .................. 2011-240225

(51) Int. Cl.
| | | |
|---|---|---|
| G02B 15/14 | (2006.01) | |
| G02B 27/64 | (2006.01) | |
| G02B 15/17 | (2006.01) | |

(52) U.S. Cl.
CPC ............ *G02B 15/17* (2013.01); *G02B 15/14* (2013.01); *G02B 27/646* (2013.01)

(58) Field of Classification Search
CPC ........ G02B 15/00; G02B 15/14; G02B 15/15; G02B 15/16; G02B 15/20; G02B 15/22; G02B 15/24; G02B 15/26; G02B 15/163; G02B 15/167; G02B 15/17; G02B 15/177
USPC .................. 359/676, 684, 686, 688
See application file for complete search history.

(56) References Cited

U.S. PATENT DOCUMENTS

| | | | | |
|---|---|---|---|---|
| 5,898,525 | A * | 4/1999 | Suzuki ................ | 359/684 |
| 5,917,658 | A * | 6/1999 | Yamanashi ........... | 359/676 |
| 6,002,527 | A * | 12/1999 | Ohtake ................ | 359/683 |
| 6,055,114 | A * | 4/2000 | Ohtake ................ | 359/676 |
| 7,532,412 | B2 | 5/2009 | Hatada | |
| 7,755,846 | B2 * | 7/2010 | Wada ................... | 359/688 |
| 2002/0063970 | A1 * | 5/2002 | Uzawa et al. ......... | 359/689 |
| 2010/0091172 | A1 * | 4/2010 | Miyazaki et al. ...... | 348/345 |
| 2010/0123956 | A1 * | 5/2010 | Wada ................... | 359/683 |
| 2010/0195218 | A1 * | 8/2010 | Uchida et al. ......... | 359/688 |
| 2011/0109978 | A1 * | 5/2011 | Yamada et al. ........ | 359/684 |

FOREIGN PATENT DOCUMENTS

| | | | |
|---|---|---|---|
| JP | H07-092390 | A | 4/1995 |
| JP | H08-220438 | A | 8/1996 |
| JP | H11-044848 | A | 2/1999 |
| JP | 2009-175324 | A | 8/2009 |
| JP | 2009-251112 | A | 10/2009 |
| JP | 2011-123464 | A | 6/2011 |
| JP | 2011-197472 | A | 10/2011 |
| JP | 2012-194288 | A | 10/2012 |

* cited by examiner

*Primary Examiner* — Thong Nguyen
(74) *Attorney, Agent, or Firm* — Canon USA Inc., IP Division

(57) ABSTRACT

A zoom lens includes, in order from the object side to the image side, a first lens unit having a positive refractive power, a second lens unit having a negative refractive power, a third lens unit having a negative refractive power, and a rear lens group including a plurality of lens units and having a positive refractive power as a whole. The distances between adjacent lens units are changed during zooming. The third lens unit is moved during focusing. The focal length, fw, of the entire zoom lens system at the wide-angle end; the focal length, ft, of the entire zoom lens system at the telephoto end; the combined focal length, f12w, of the first and second lens units at the wide-angle end; and the combined focal length, f12t, of the first and second lens units at the telephoto end are appropriately set to satisfy predetermined conditions.

7 Claims, 16 Drawing Sheets

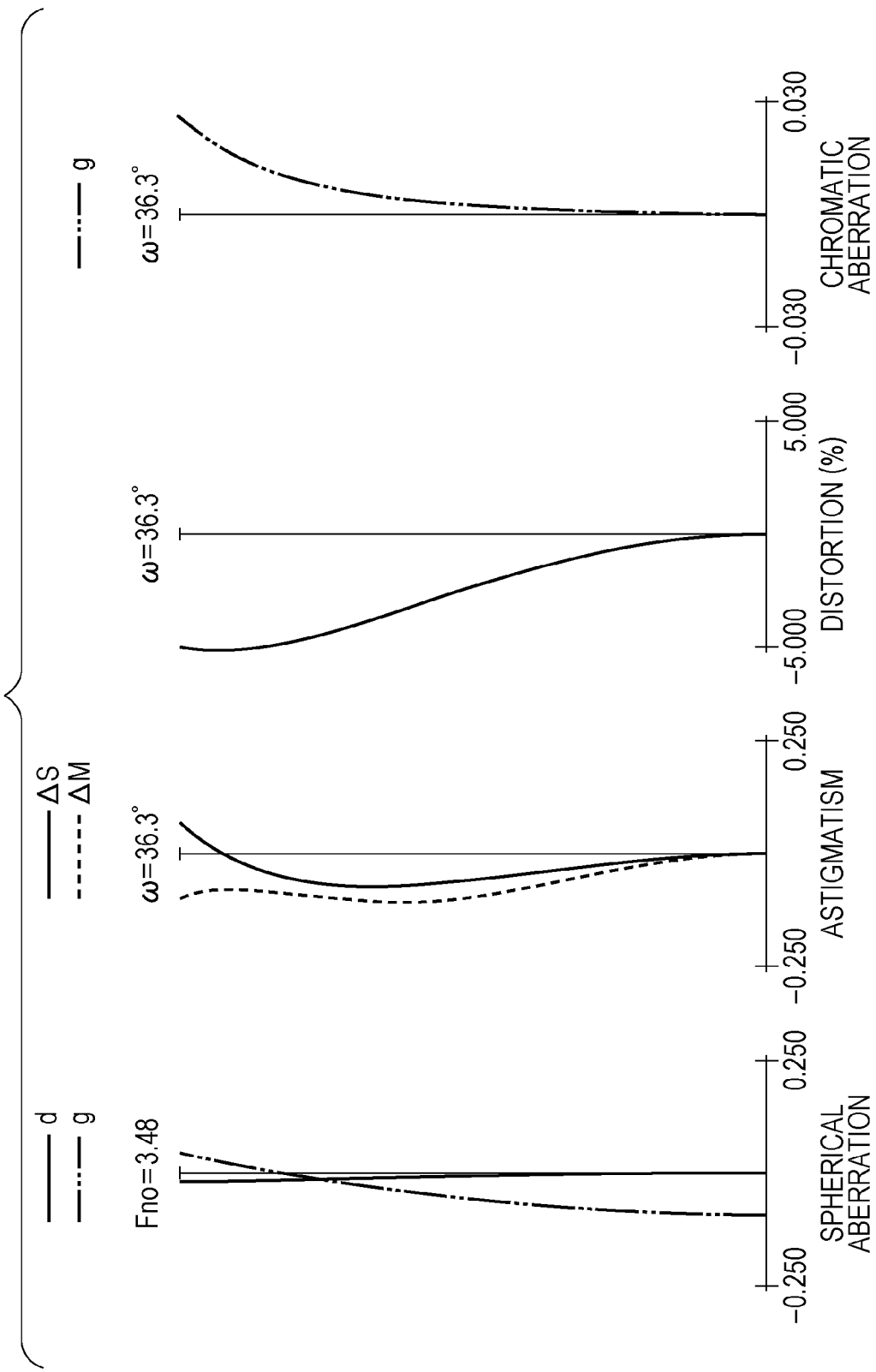

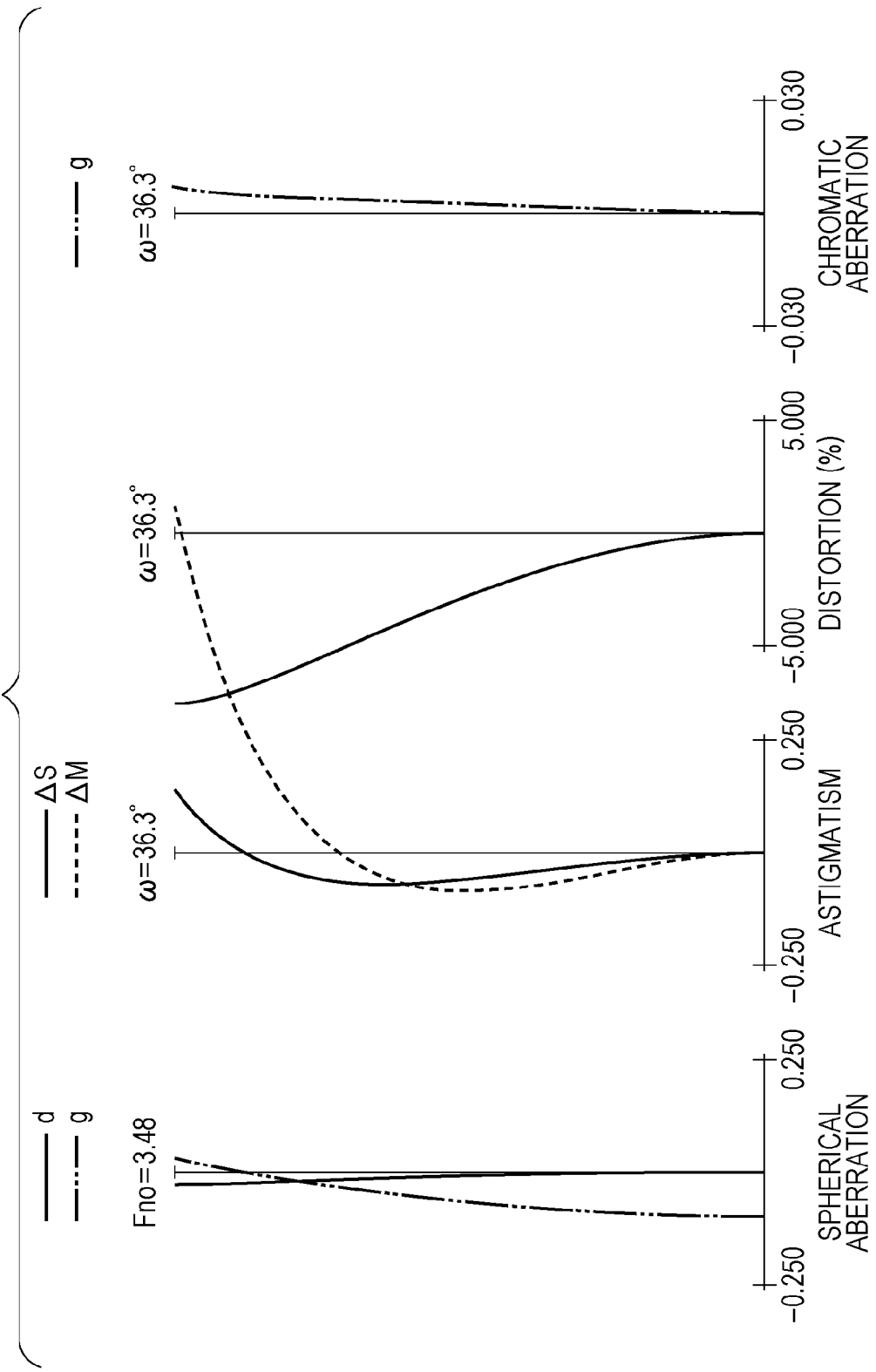

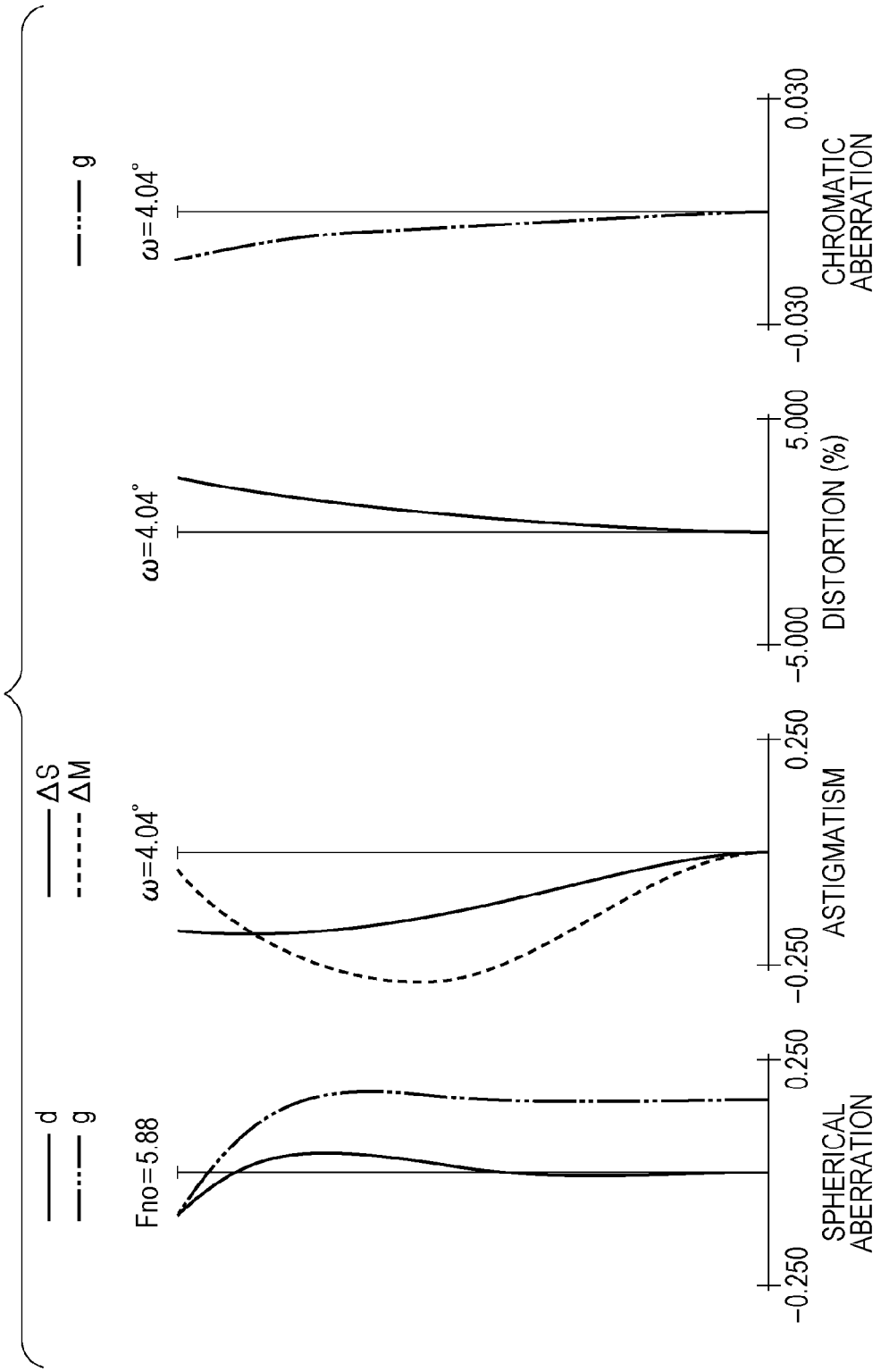

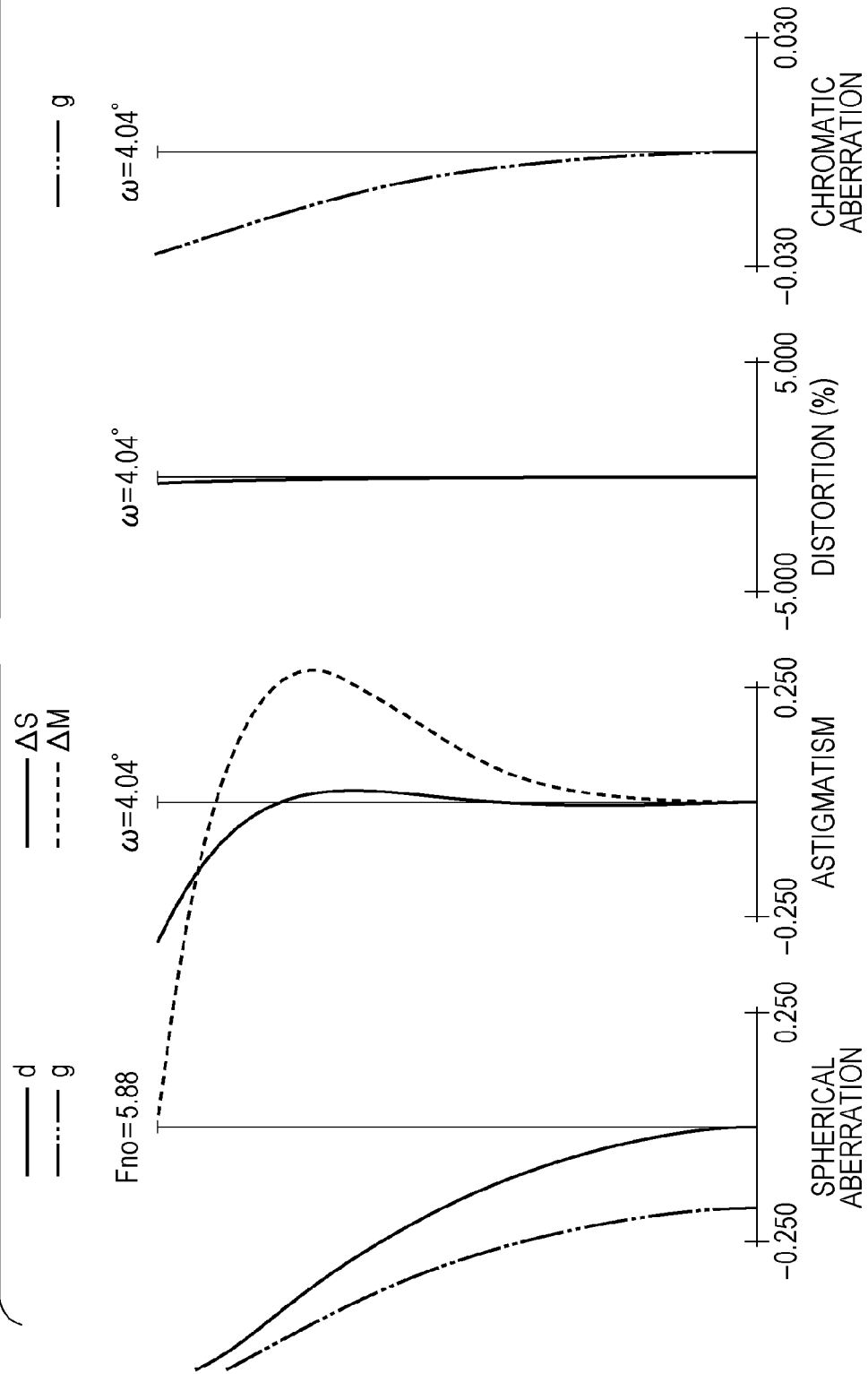

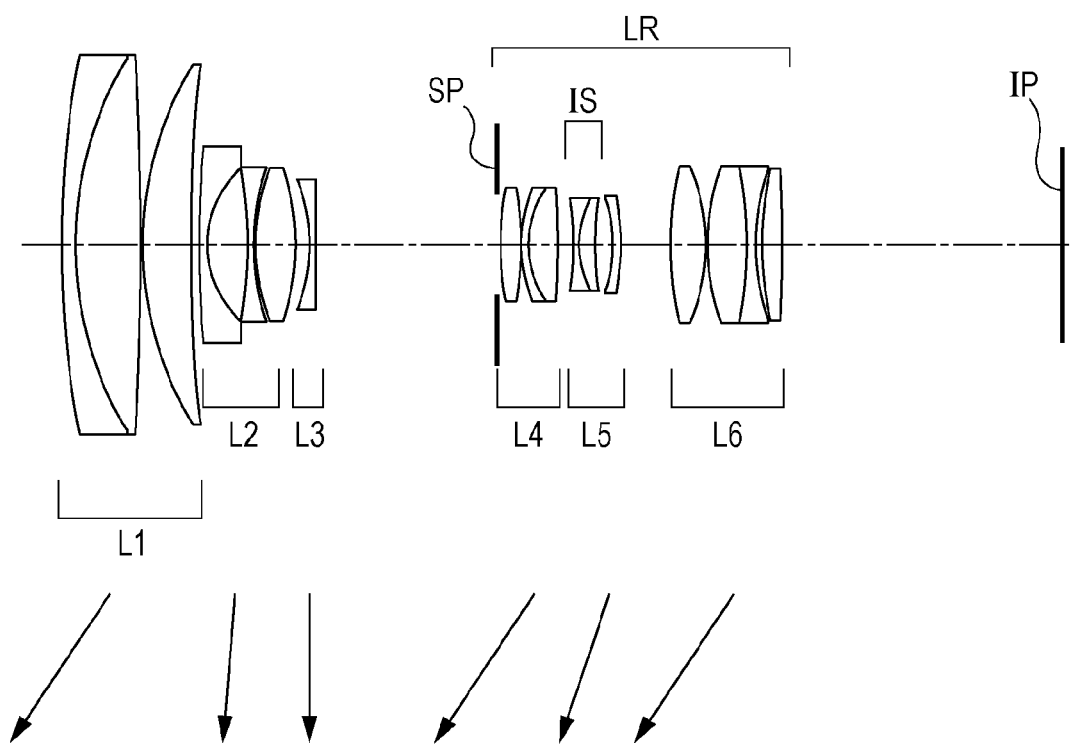

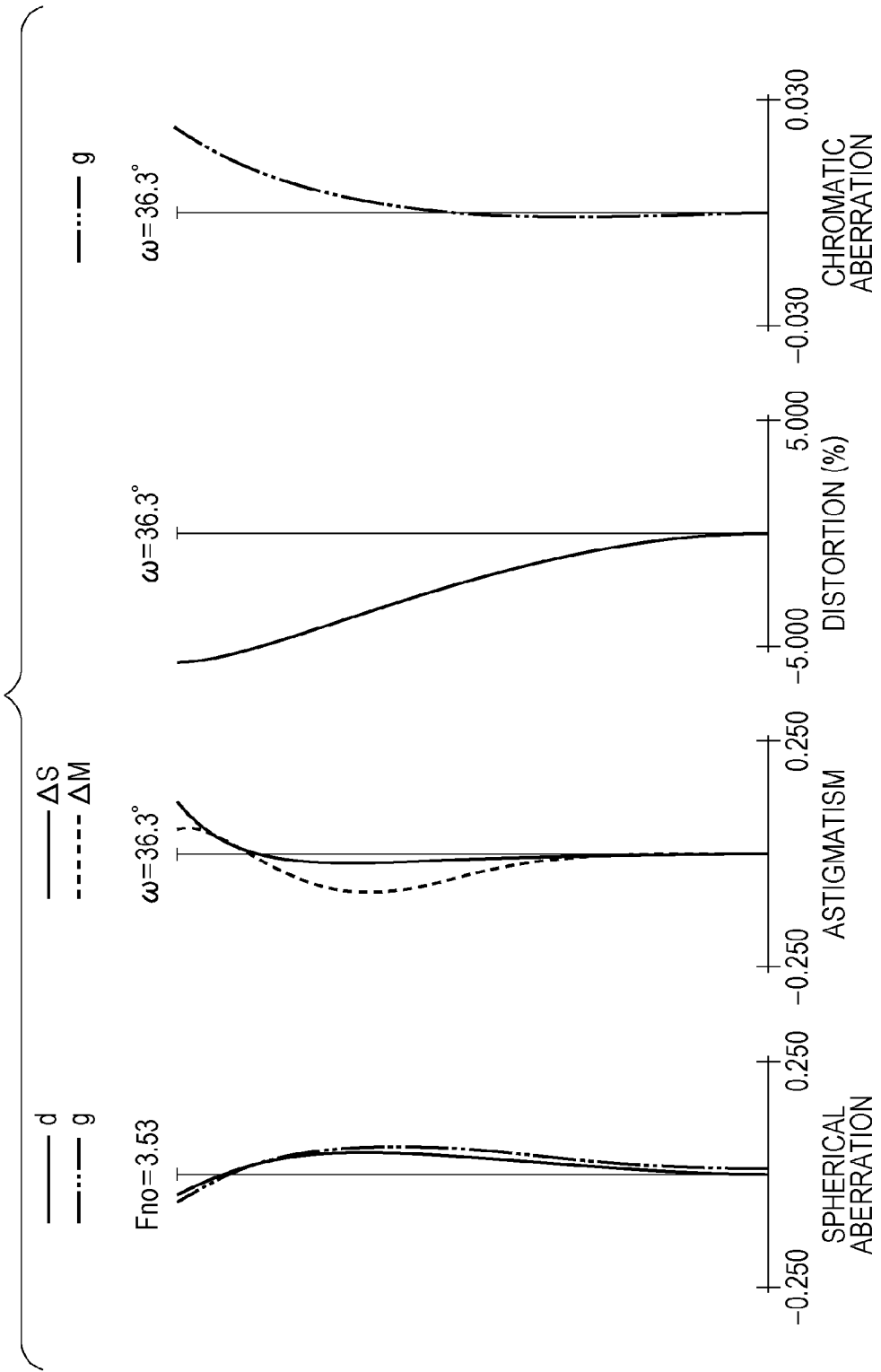

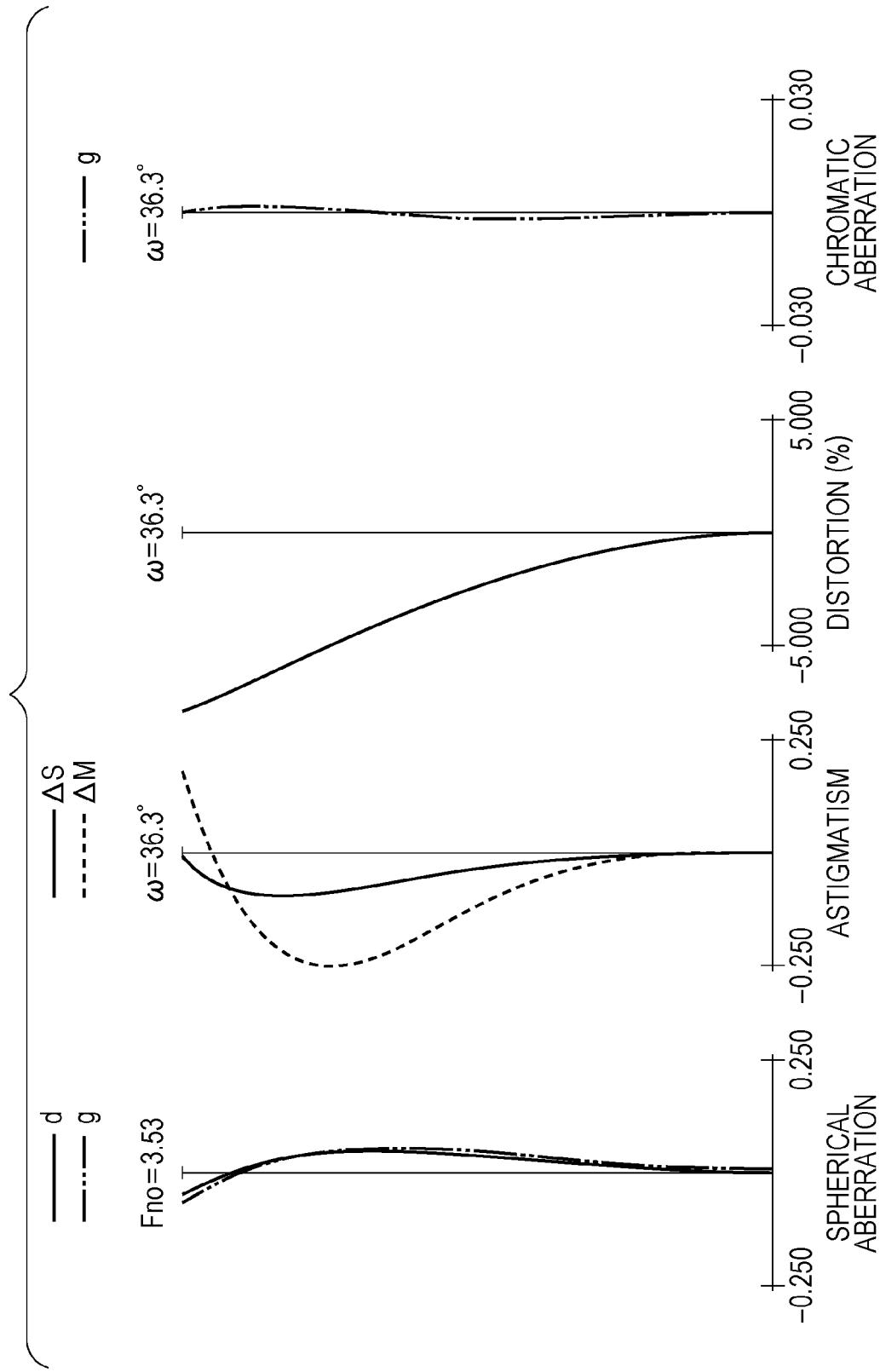

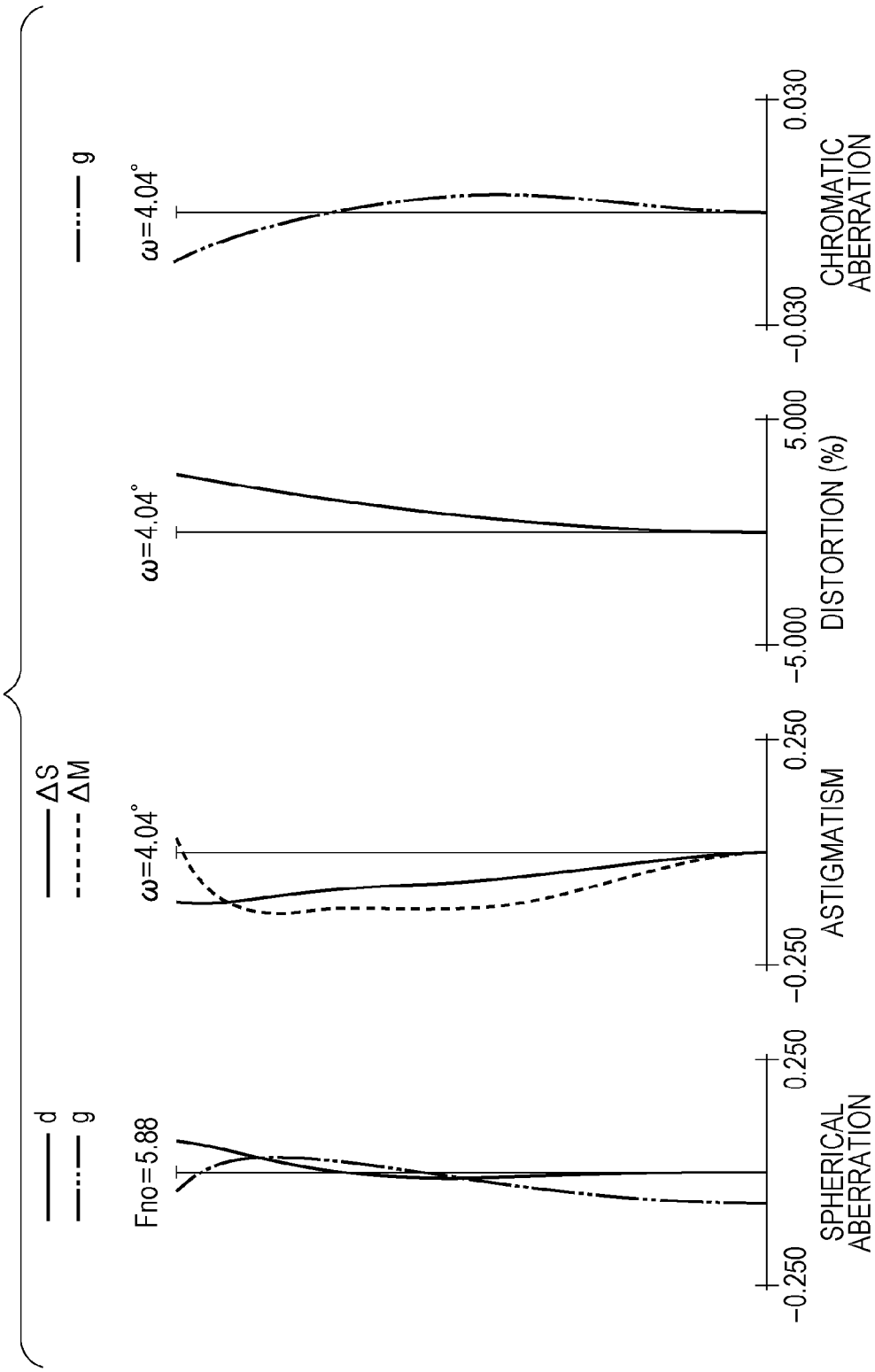

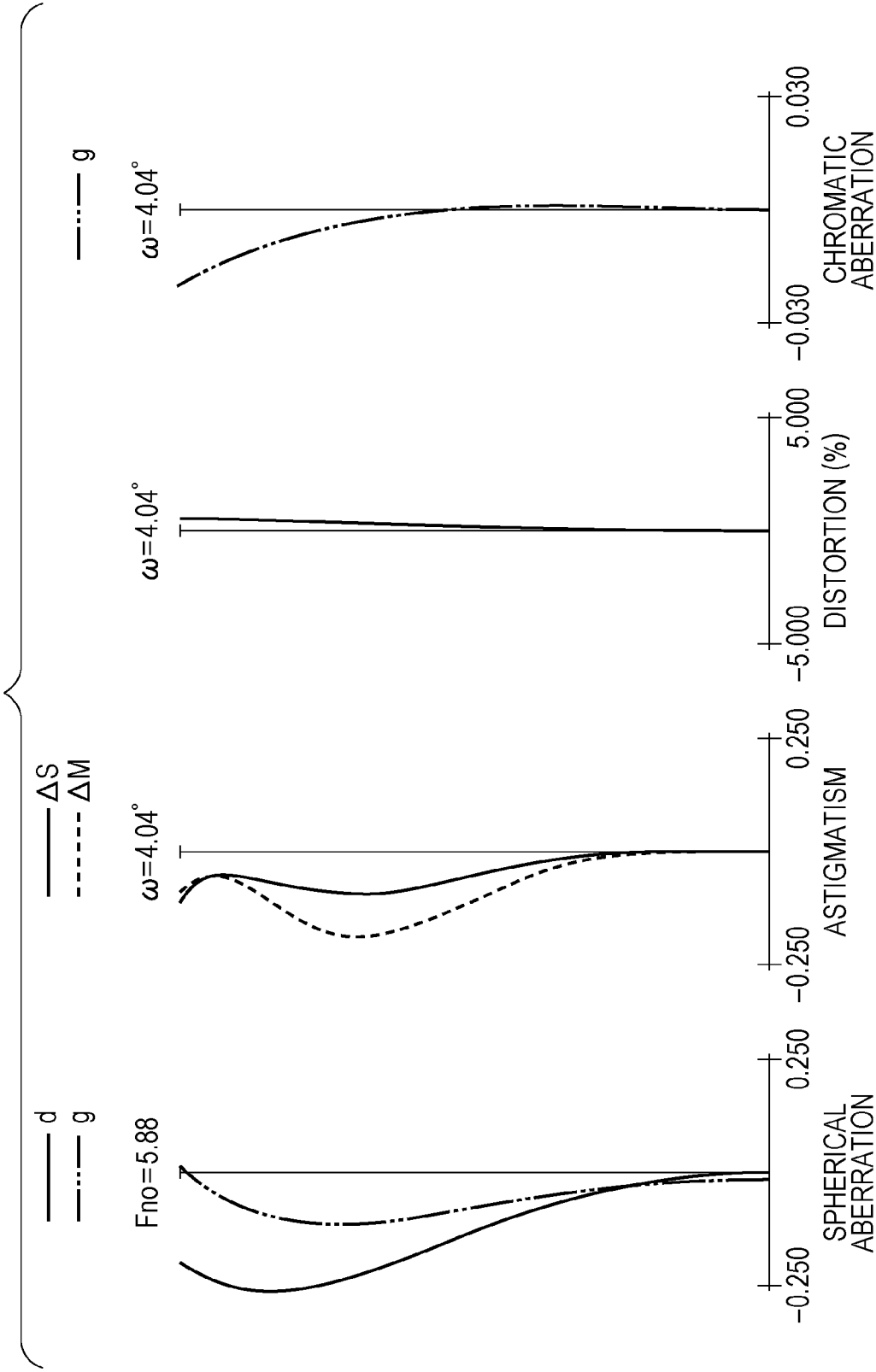

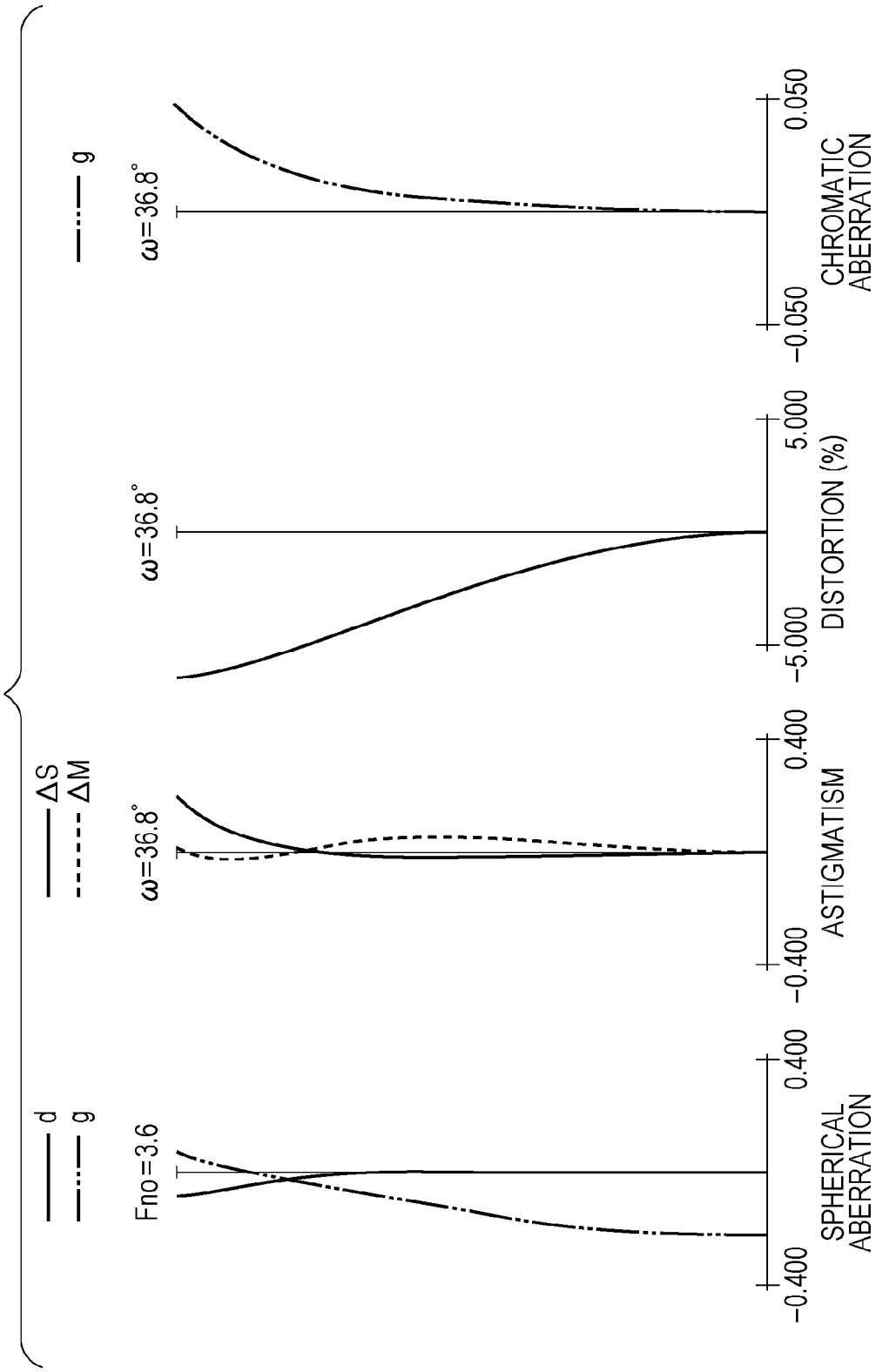

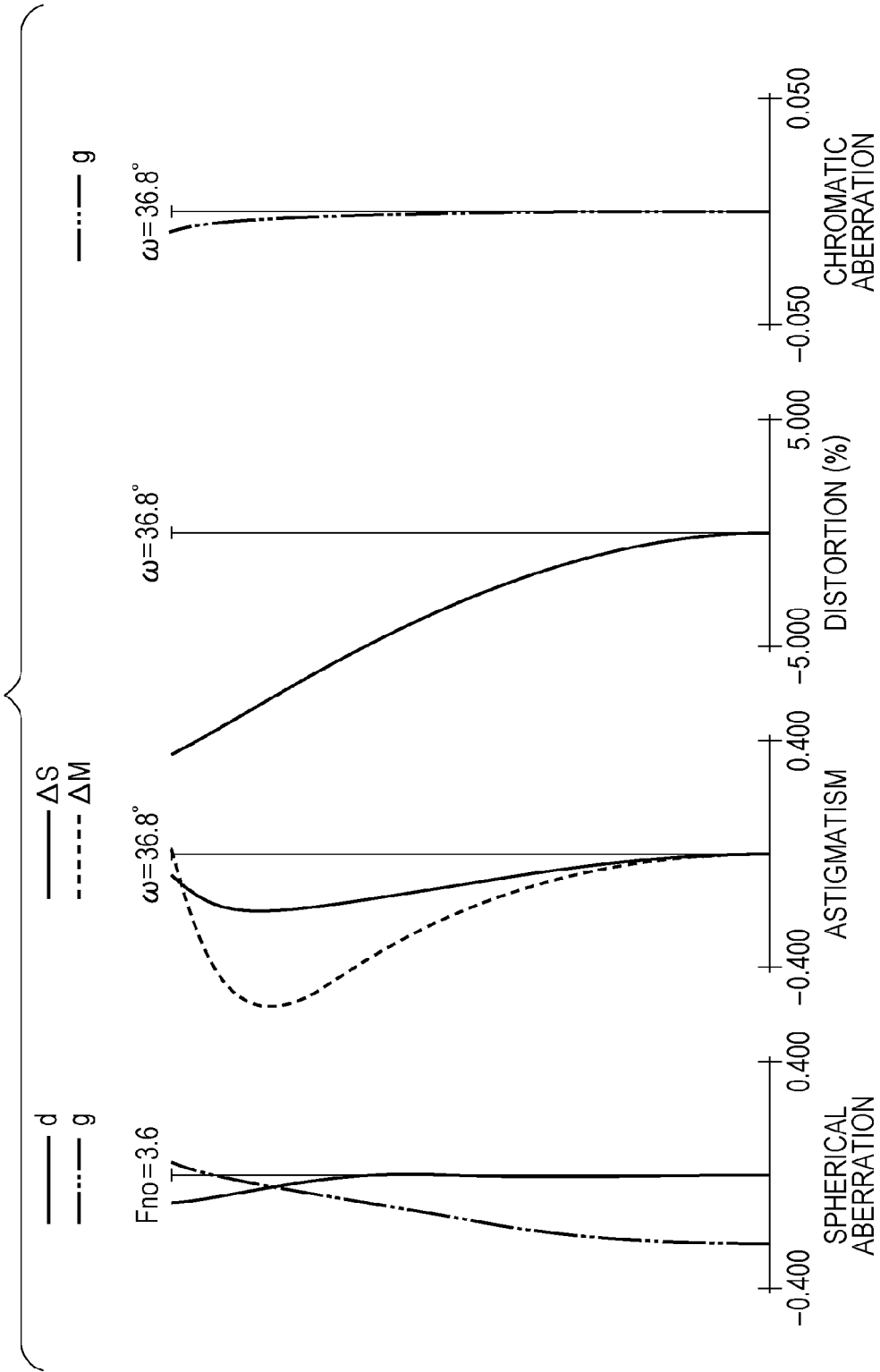

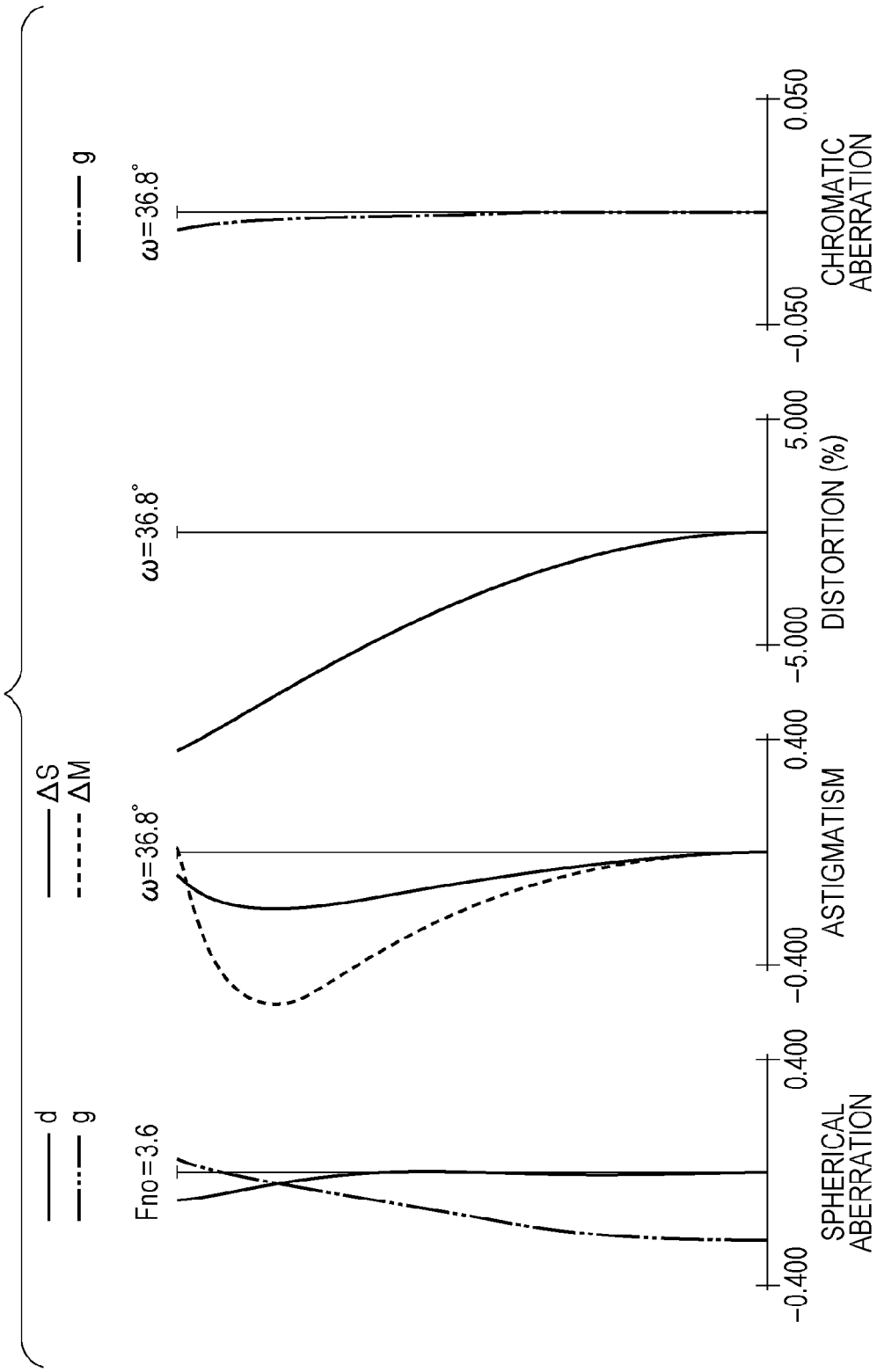

ZOOM LENS AND IMAGE PICK-UP APPARATUS HAVING THE SAME

BACKGROUND OF THE INVENTION

1. Field of the Invention

The present invention relates to a zoom lens and an image pick-up apparatus equipped with the zoom lens; the zoom lens may be suitable for image pick-up optical systems, such as single lens reflex (SLR) cameras, digital still cameras, digital video cameras, TV cameras, and surveillance cameras.

2. Description of the Related Art

Known focusing methods for zoom lenses include front-lens focusing, in which a first lens unit on an object side is moved, and inner focusing and rear focusing, in which the second and subsequent lens units are moved.

Conventionally, inner-focus and rear-focus zoom lenses can be easily reduced in size because the first lens unit in these types of zoom lens typically has a smaller effective diameter than the first lens unit of front-lens focusing zoom lenses. In addition, because relatively small and light-weight lens units are moved to achieve focus, quick focusing can be easily performed particularly in cameras having an auto-focus function.

An example of zoom lenses that can easily achieve a high zoom ratio is a positive-lead type zoom lens, in which the lens unit on the extreme object side is a lens unit having a positive refractive power. An example of such positive-lead type zoom lenses is a zoom lens that includes, in order from the object side to the image side, a first lens unit having a positive refractive power, a second lens unit having a negative refractive power, and a rear lens group including a plurality of lens units and having a positive refractive power as a whole and that performs zooming by changing the distances between the lens units.

Such positive-lead type zoom lenses include a zoom lens that performs focusing by moving the second lens unit having a negative refractive power.

In positive-lead type zoom lenses, the second lens unit having a negative refractive power mainly changes the magnification. The second lens unit having a negative refractive power has a negative magnification factor at the wide-angle end, and the absolute value of the magnification increases with zooming toward the telephoto end (in the direction from the negative magnification factor toward −1). This tendency becomes clearer, particularly in the case of zoom lenses having a high zoom ratio.

The image-forming magnification of a focus lens unit and the focus sensitivity (the ratio between the distance of movement of the focus lens unit per unit and the amount of shift of focus) are expressed by the following expression:

$$ES = (1-\beta f^2) \times \beta r^2$$

where ES is the focus sensitivity, βf is the image-forming magnification of the focus lens unit, and βr is the combined magnification of all the lens units disposed on the image side with respect to the focus lens unit.

The above expression shows that the focus sensitivity, which is 0 when the absolute value of the image-forming magnification, βf, of the focus lens unit is 1, increases as the absolute value of the image-forming magnification gets farther from 1.

In many positive-lead type zoom lenses, the second lens unit having a negative refractive power changes the magnification in the direction from the negative magnification factor toward −1, during zooming from the wide-angle end to the telephoto end. Thus, when an image of a near object is captured using a zoom lens having a high zoom ratio, the focus sensitivity of the second lens unit is low near the telephoto end, and the distance of movement of the focus lens unit increases. Furthermore, when the image-forming magnification of the second lens unit reaches −1 while changing magnification, the focus sensitivity becomes 0; this disables focusing.

Therefore, when a high zoom ratio is to be achieved with a positive-lead type zoom lens employing a rear focusing method, it is important to arrange the refractive powers of the lens units and select the focusing lens unit appropriately so that the focus sensitivity does not become too small. Setting of the refractive powers of the lens units located on the object side with respect to the focusing lens unit is particularly important. If inappropriate refractive powers are set, it is difficult to achieve focus over a wide object distance while suppressing an increase in distance of movement of the focusing lens unit.

The present invention provides a zoom lens having a high zoom ratio, which can achieve focus without significantly increasing the distance of movement of the focus lens unit, and an image pick-up apparatus having the zoom lens.

SUMMARY OF THE INVENTION

The present invention provides a zoom lens including, in order from an object side to an image side: a first lens unit having a positive refractive power; a second lens unit having a negative refractive power; a third lens unit having a negative refractive power; and a rear lens group including a plurality of lens units and having a positive refractive power as a whole, in which the distances between adjacent lens units are changed during zooming, the third lens unit moves during focusing, and Conditions $3.7 < |f12w/fw|$ and $1.0 < |f12t/ft|$ are satisfied, where fw is the focal length of the entire zoom lens system at a wide-angle end, ft is the focal length of the entire zoom lens system at a telephoto end, f12w is the combined focal length of the first and second lens units at the wide-angle end, and f12t is the combined focal length of the first and second lens units at the telephoto end.

Further features of the present invention will become apparent from the following description of exemplary embodiments with reference to the attached drawings.

BRIEF DESCRIPTION OF THE DRAWINGS

FIGS. 2A and 2B are longitudinal aberration diagrams when the zoom lens, according to the first embodiment, is focused on an object at infinity and on a near object, respectively, at the wide-angle end (short focal length end).

FIGS. 3A and 3B are longitudinal aberration diagrams when the zoom lens, according to the first embodiment, is focused on an object at infinity and on a near object, respectively, at the telephoto end (long focal length end).

FIG. 4 is a cross-sectional view of a zoom lens at the wide-angle end (short focal length end), according to a second embodiment of the present invention.

FIGS. 5A and 5B are longitudinal aberration diagrams of the zoom lens, according to the second embodiment, when the zoom lens is focused on an object at infinity and on a near object, respectively, at the wide-angle end (short focal length end).

FIGS. 6A and 6B are longitudinal aberration diagrams of the zoom lens, according to the second embodiment, when the zoom lens is focused on an object at infinity and on a near object, respectively, at the telephoto end (long focal length end).

FIGS. 8A and 8B are longitudinal aberration diagrams of the zoom lens, according to the third embodiment, when the zoom lens is focused on an object at infinity and on a near object, respectively, at the wide-angle end (short focal length end).

FIGS. 9A and 9B are longitudinal aberration diagrams of the zoom lens, according to the third embodiment, when the zoom lens is focused on an object at infinity and on a near object, respectively, at the telephoto end (long focal length end).

DESCRIPTION OF THE EMBODIMENTS

Embodiments of the present invention will be described in detail below with reference to the attached drawings. A zoom lens of the present invention includes, in order from the object side to the image side, a first lens unit having a positive refractive power, a second lens unit having a negative refractive power, a third lens unit having a negative refractive power, a rear lens group including a plurality of lens units and has a positive refractive power as a whole. The distance between adjacent lens units changes during zooming. The third lens unit moves during focusing.

Figure 1:
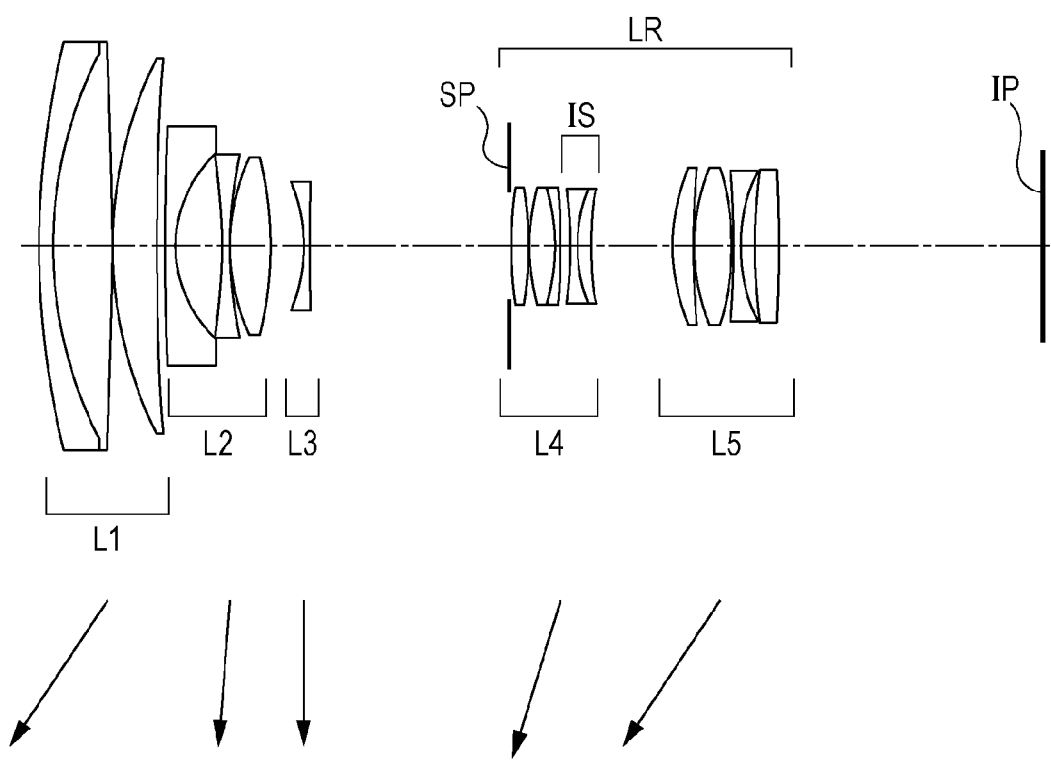
FIG. 1 is a cross-sectional view of a zoom lens at the wide-angle end (short focal length end), according to a first embodiment of the present invention.

FIG. 1 is a cross-sectional view of a zoom lens according to a first embodiment of the present invention, when focused on an object at infinity at the wide-angle end (short focal length end). FIGS. 2A and 2B are longitudinal aberration diagrams when the zoom lens according to the first embodiment is focused on an object at infinity and on a near object located at, for example, 0.5 meters (m), respectively, at the wide-angle end. FIGS. 3A and 3B are longitudinal aberration diagrams when the zoom lens according to the first embodiment is focused on an object at infinity and on a near object (0.5 m), respectively, at the telephoto end (long focal length end).

Herein, the distance "0.5 m" to the near object is the distance when the numerical examples below are expressed in millimeters (mm). FIG. 4 is a cross-sectional view of a zoom lens according to a second embodiment of the present invention, when focused on an object at infinity at the wide-angle end. FIGS. 5A and 5B are longitudinal aberration diagrams of the zoom lens according to the second embodiment, when focused on an object at infinity and a near object (0.5 m), respectively, at the wide-angle end. FIGS. 6A and 6B are longitudinal aberration diagrams of the zoom lens according to the second embodiment, when focused on an object at infinity and a near object (0.5 m), respectively, at the telephoto end.

Figure 7:
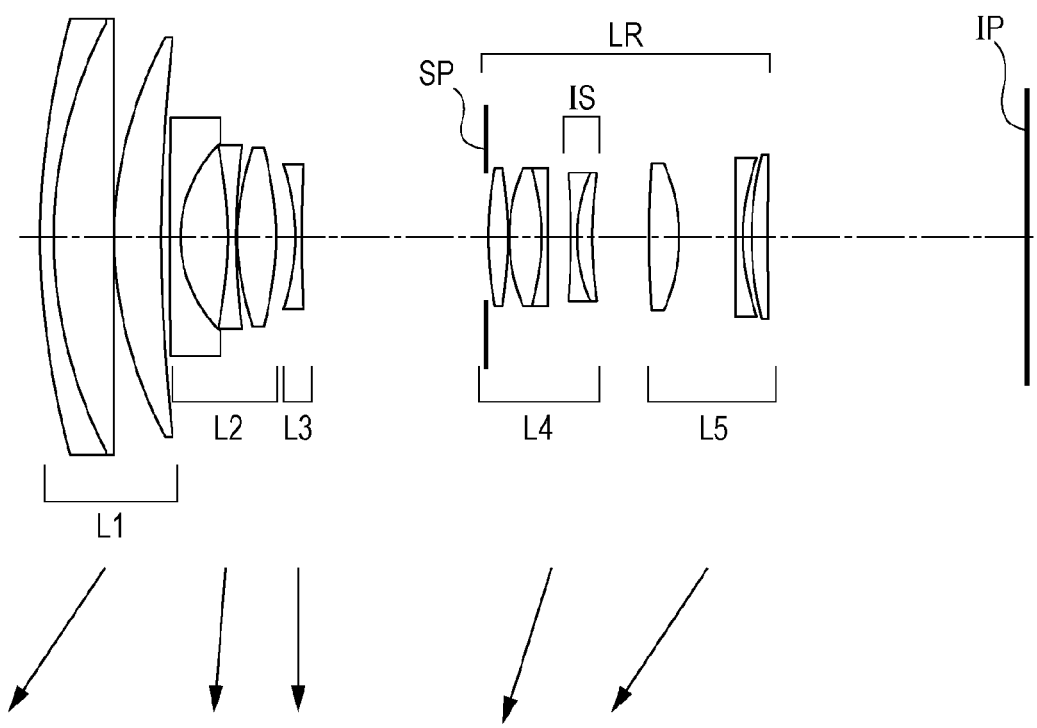
FIG. 7 is a cross-sectional view of a zoom lens at the wide-angle end (short focal length end), according to a third embodiment of the present invention.
Figure 9B:
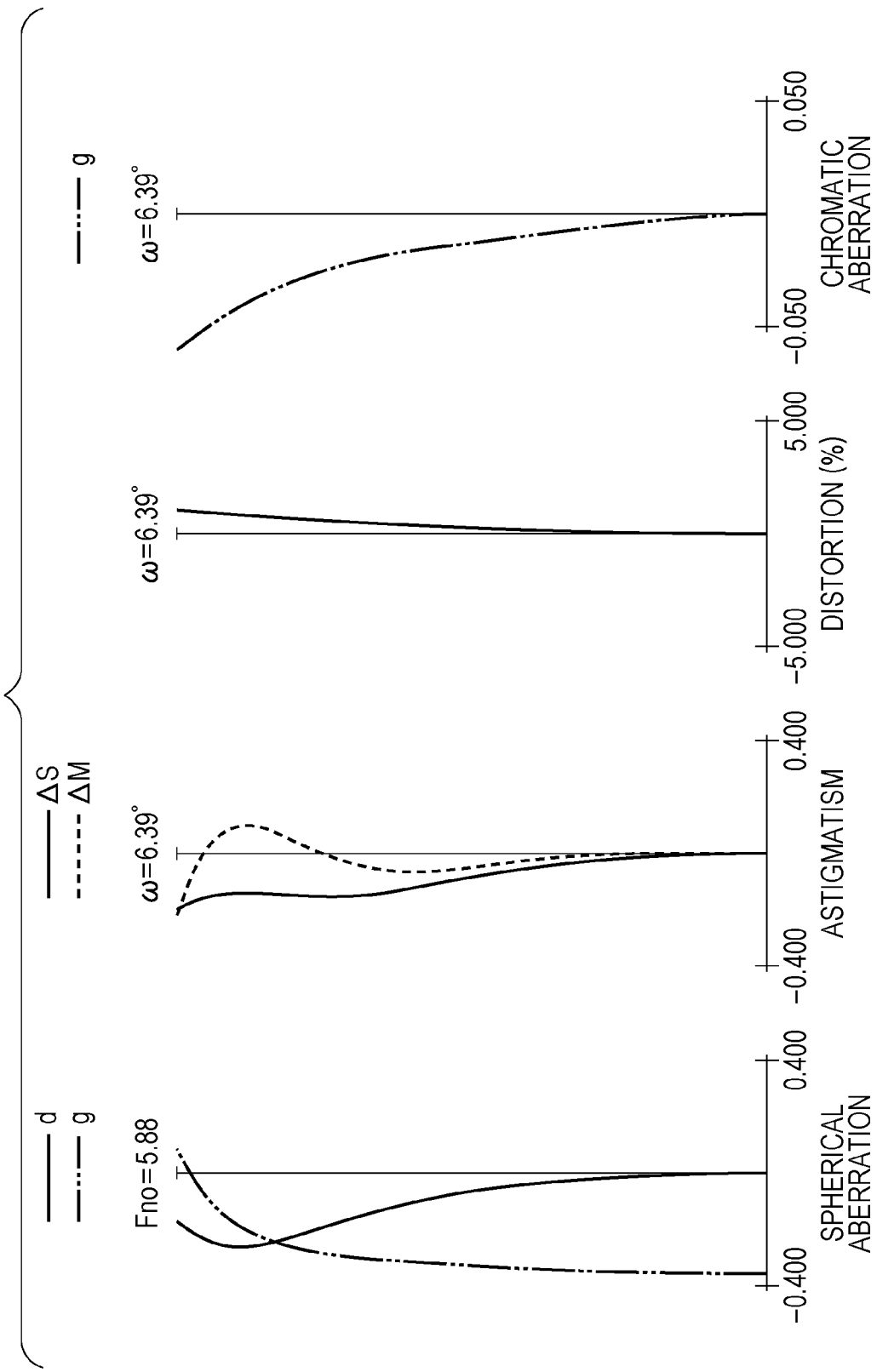

FIG. 7 is a cross-sectional view of a zoom lens according to a third embodiment of the present invention, when focused on an object at infinity at the wide-angle end. FIGS. 8A and 8B are longitudinal aberration diagrams of the zoom lens according to the third embodiment, when focused on an object at infinity and a near object (0.5 m), respectively, at the wide-angle end. FIGS. 9A and 9B are longitudinal aberration diagrams of the zoom lens according to the third embodiment, when focused on an object at infinity and a near object (0.5 m), respectively, at the telephoto end.

Figure 10:
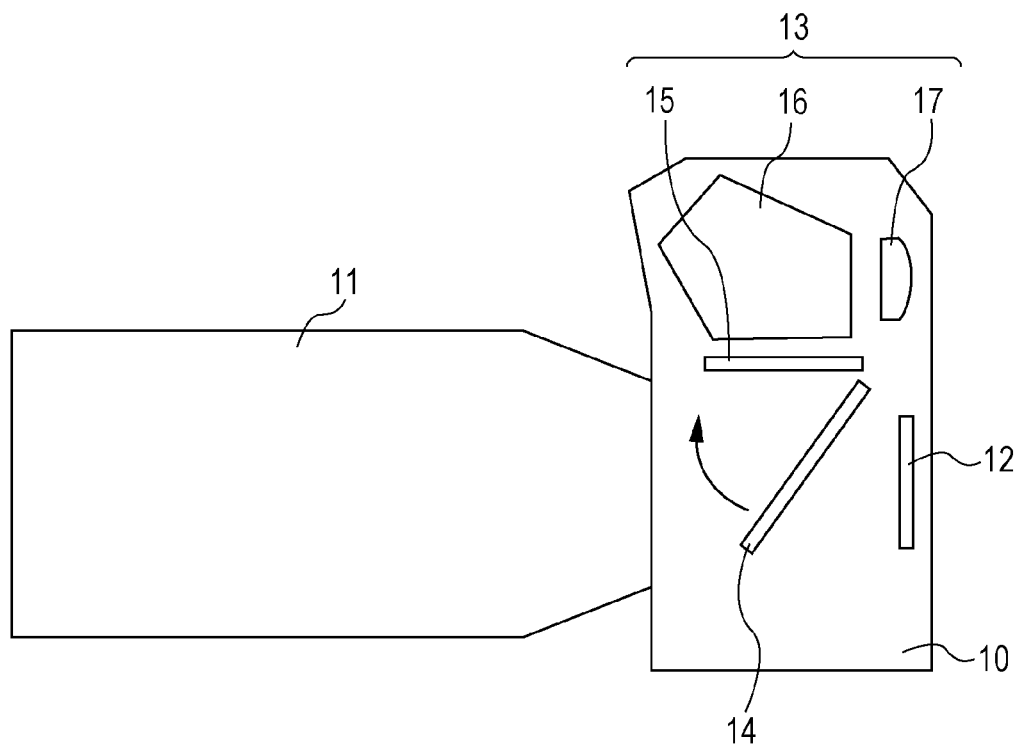
FIG. 10 is a schematic diagram of relevant parts of an image pick-up apparatus, according to an embodiment of the present invention.

FIG. 10 is a schematic diagram of the relevant part of a camera (image pick-up apparatus) having the zoom lens of the present invention. The zoom lens according to the present embodiments is an image pick-up lens system for image pick-up apparatuses, such as video cameras, digital cameras, and silver-halide film cameras. In the cross-sectional views, the left side corresponds to the object side (front side), and the right side corresponds to the image side (rear side). In the cross-sectional views, "i" represents the place of the lens unit expressed in number counted from the object side, and "Li" means an i-th lens unit. The reference numeral "LR" represents a rear lens group that includes a plurality of lens units and has a positive refractive power as a whole. The rear lens group LR includes an image-stabilizing lens unit IS that has a negative refractive power and moves in a direction having a component perpendicular to the optical axis to move an image formation position in the direction perpendicular to the optical axis.

FIGS. 1 and 7 show a first lens unit L1 having a positive refractive power, a second lens unit L2 having a negative refractive power, a third lens unit L3 having a negative refractive power, a fourth lens unit L4 having a positive refractive power, and a fifth lens unit L5 having a positive refractive power. Herein, the term "refractive power" means the optical power and is the reciprocal of the focal length. A rear lens group LR is composed of the fourth lens unit L4 and the fifth lens unit L5. An image-stabilizing lens unit IS has a negative refractive power and constitutes part of the fourth lens unit L4.

FIG. 4 shows a first lens unit L1 having a positive refractive power, a second lens unit L2 having a negative refractive power, a third lens unit L3 having a negative refractive power, a fourth lens unit L4 having a positive refractive power, a fifth lens unit L5 having a negative refractive power, a sixth lens unit L6 having a positive refractive power. A rear lens group LR is composed of the fourth lens unit L4 to the sixth lens unit L6. An image-stabilizing lens unit IS has a negative refractive power and constitutes part of the fifth lens unit L5. In the cross-sectional views, an aperture stop SP is located on the object side with respect to the fourth lens unit L4.

An image plane IP is located on an image pick-up surface of a solid-state image pick-up device (photoelectric conversion element), such as a CCD sensor or a CMOS sensor, when the zoom lens is used as the image pick-up optical system of a video camera or a digital still camera, and is located on a photosensitive surface corresponding to a film surface in the case of a silver-halide film camera. In spherical aberration diagrams, "d" and "g" represent d line and g line, respectively. In astigmatism diagrams, "ΔM" and "ΔS" represent a meridional image plane and a sagittal image plane, respectively. In lateral chromatic aberration diagrams, "g" represents g line. In these diagrams, "ω" represents the half angle of view (in degrees), and "Fno" represents the F number.

In the present embodiments, the terms "wide-angle end" and "telephoto end" are indicative of the zoom positions when the respective lens units are located at the respective ends of the range in which they can move along the optical axis, in terms of mechanical movement. In the cross-sectional views, arrows show the moving paths (loci) of the respective lens units when zoomed from the wide-angle end to the telephoto end. As illustrated, the zoom lens in each of FIGS. 1, 4 and 7 is at the wide-angle end.

In the first and third embodiments, shown in FIGS. 1 and 7, respectively, the first lens unit L1 moves toward the object side when zoomed from the wide-angle end to the telephoto end, as indicated by the arrow. The second lens unit L2 moves toward the object side while increasing the distance with respect to the first lens unit L1. The third lens unit L3 moves toward the object side while increasing the distance with respect to the second lens unit L2. The fourth lens unit L4 moves toward the object side while reducing the distance with respect to the third lens unit L3. The fifth lens unit L5 moves toward the object side while reducing the distance with respect to the fourth lens unit L4. The aperture stop SP moves together with the fourth lens unit L4.

In the second embodiment shown in FIG. 4, when zoomed from the wide-angle end to the telephoto end, the first lens unit L1 moves toward the object side, as indicated by the arrow. The second lens unit L2 moves toward the object side while increasing the distance with respect to the first lens unit L1. The third lens unit L3 moves toward the object side while increasing the distance with respect to the second lens unit L2. The fourth lens unit L4 moves toward the object side while reducing the distance with respect to the third lens unit L3. The fifth lens unit L5 moves toward the object side while increasing the distance with respect to the fourth lens unit L4. The sixth lens unit L6 moves toward the object side while reducing the distance with respect to the fifth lens unit L5. The aperture stop SP moves together with the fourth lens unit L4.

In the present embodiments, a change of focus from an object at infinity to a near object is performed by moving the third lens unit L3 toward the image side along the optical axis. In the present embodiments, the image-stabilizing lens unit IS corrects an image blur that occurs when the whole zoom lens is shaken. This correction occurs, by moving the entire image-stabilizing lens unit IS (or a component thereof) in a direction having a component substantially perpendicular to the optical axis, thereby moving an image (captured image) substantially perpendicular to the optical axis. In other words, image-stabilizing is performed. The image-stabilizing lens unit IS may be the entirety of the fourth lens unit L4 or fifth lens unit L5, or part (a lens subunit) thereof.

Next, the characteristics of the present embodiments will be described. Conditional Expressions (1) and (2) below are satisfied:

$$3.7 < |f12w/fw| \quad (1)$$

$$1.0 < |f12t/ft| \quad (2)$$

where fw is the focal length of the entire zoom lens system at the wide-angle end, ft is the focal length of the entire zoom lens system at the telephoto end, f12w is the combined focal length of the first lens unit L1 and the second lens unit L2 at the wide-angle end where f12w is calculated from $1/f12w = 1/f1 + 1/f2 - dw/(f1 \cdot f2)$, and f12t is the combined focal length of the first lens unit L1 and the second lens unit L2 at the telephoto end where f12t is calculated from $1/f12t = 1/f1 + 1/f2 - dt/(f1 \cdot f2)$. dw is a distance between a principal point of the first lens unit and a principal point of the second lens unit at the wide-angle end, and dt is a distance between a principal point of the first lens unit and a principal point of the second lens unit at the telephoto end.

Conditional Expression (1) is a condition to reduce fluctuations of aberrations over the entire focusing range and to obtain a high optical performance over the entire image at the wide-angle end. Conditional Expression (1) defines the combined focal length, at the wide-angle end, of the first lens unit L1 and the second lens unit L2 which are located on the object side with respect to the third lens unit L3, serving as the focus lens unit. By satisfying Conditional Expression (1), the incident angle of the axial ray incident on the third lens unit L3, serving as the focus lens unit, at the wide-angle end is reduced, and fluctuations of the incident height of the axial ray, which are caused by focusing, are reduced. Thus, fluctuations of axial chromatic aberration and spherical aberration at the wide-angle end due to focusing are reduced.

Conditional Expression (2) is a condition to reduce fluctuations of aberrations over the entire focusing range at the telephoto end and to obtain a high optical performance over the entire image. Conditional Expression (2) defines the combined focal length, at the telephoto end, of the first lens unit L1 and the second lens unit L2 located on the object side with respect to the third lens unit L3. By satisfying Conditional Expression (2), the incident angle of the axial ray incident on the third lens unit L3, serving as the focus lens unit, at the telephoto end is reduced, and fluctuations of the incident height of the axial ray, which are caused by focusing, are reduced. Thus, fluctuations of axial chromatic aberration and spherical aberration at the telephoto end due to focusing are reduced.

Furthermore, by simultaneously satisfying Conditional Expressions (1) and (2), the incident angle of the axial ray incident on the third lens unit L3 can be reduced over the entire zoom area, and thus, fluctuations of axial chromatic aberration and spherical aberration due to focusing can be easily reduced. More desirably, the value ranges of Conditional Expressions (1) and (2) are set as follows:

$$4.0 < |f12w/fw| < 8.5 \quad (1a)$$

$$1.5 < |f12t/ft| < 5.5 \quad (2a).$$

In the present embodiments, desirably, Conditional Expression (3) below is satisfied.

$$0.1 < |f3/ft| < 0.6 \quad (3)$$

where f3 is the focal length of the third lens unit L3.

Conditional Expression (3) defines the focal length of the third lens unit L3, serving as the focus lens unit. If the upper limit of Conditional Expression (3) is exceeded, the distance of movement of the third lens unit L3 during focusing increases, making it difficult to achieve a compact zoom lens system. If the lower limit of Conditional Expression (3) is exceeded, which is good for achieving a high zoom ratio, Petzval sum increases in the negative direction, making it difficult to correct astigmatism over the entire zooming range. In addition, fluctuations of astigmatism increase at the wide-angle end during focusing. More desirably, the value range of Conditional Expression (3) is set as follows:

$$0.12 < |f3/ft| < 0.40 \quad (3a).$$

The third lens unit L3 is desirably composed of a single lens component, which means a single lens or a cemented lens composed of a plurality of lenses joined together.

By satisfying Conditional Expressions (1) and (2), fluctuations of aberration during focusing can be easily suppressed even with the focus lens unit composed of a single lens component. By making the focus lens unit be composed of a single lens component, the focus lens unit can be reduced in size and weight, making it easy to achieve quick focusing during auto-focusing. Furthermore, because the distances of movement of the lens units can be increased by reducing the thicknesses thereof along the optical axis, a compact zoom lens having a high zoom ratio can be easily achieved.

Desirably, the third lens unit L3 has an aspherical lens surface. The aspherical surface reduces fluctuations of astigmatism at the wide-angle end due to focusing, whereby it is easy to obtain a good optical performance even with the third lens unit L3 that is composed of a single lens component.

Next, the configurations of the first lens unit L1 and second lens unit L2 will be described. Lenses in the respective lens units will be described in order from the object side to the image side. The first lens unit L1 includes a cemented lens composed of a negative lens and a positive lens joined together, and a positive meniscus lens having a convex surface on the object side. In the zoom lenses according to the present embodiments, aberrations generated in the first lens unit L1, in particular, spherical aberration generated on the telephoto side, are significant. To reduce such aberrations, the positive refractive power of the first lens unit L1 is jointly achieved by the cemented lens and the positive lens.

In the second lens unit L2, the absolute value of the refractive power is higher on the image side than on the object side, and the second lens unit L2 includes a negative lens having a concave lens surface on the image side, a negative lens having a concave lens surface on the image side, and a double convex positive lens. In the zoom lenses according to the present embodiments, aberrations generated in the second lens unit L2, in particular, distortion and curvature of field on the wide-angle side, are significant.

To reduce the curvature of field, in the present embodiments, the negative refractive power of the second lens unit L2 is jointly achieved by the two negative lenses. This lens configuration achieves an increase in the angle of view, a reduction in the effective diameter of the front lens, and a high optical performance. The lens configuration of the rear lens group LR will be described below.

In the first and third embodiments, the entirety of the fourth lens unit L4 or a lens subunit thereof having a negative refractive power is moved in a direction having a component perpendicular to the optical axis to shift the image formation position in the direction perpendicular to the optical axis. In the second embodiment, the entirety of the fifth lens unit L5 or a lens subunit thereof having a negative refractive power is moved in a direction having a component perpendicular to the optical axis to shift the image formation position in the direction perpendicular to the optical axis.

In the first and third embodiments, the fourth lens unit L4 includes a positive lens, a cemented lens composed of a positive lens and a negative lens, and a cemented lens composed of a negative lens and a positive lens (image-stabilizing lens unit IS). Furthermore, in the second embodiment, the fourth lens unit L4 includes a positive lens and a cemented lens composed of a negative lens and a positive lens.

In the first embodiment, the fifth lens unit L5 includes a positive lens, a positive lens, a negative lens, and a positive lens. In the second embodiment, the fifth lens unit L5 includes a cemented lens composed of a negative lens and a positive lens (image-stabilizing lens unit IS), and a negative lens. In the second embodiment, the sixth lens unit L6 includes a positive lens, a cemented lens composed of a positive lens and a negative lens, and a positive lens. By configuring the rear lens group LR as above, a high optical performance over the entire zooming range is achieved.

As has been described above, the present embodiments provide zoom lenses having a high zoom ratio and including a small and light focus lens unit that does not require an extremely large distance of movement during focusing.

First to third numerical examples corresponding to the first to third embodiments will be shown below. In each numerical example, "i" represents the place of the surface expressed in number counted from the object side, "ri" represents the radius of curvature of the i-th surface, "di" represents the distance between the i-th surface and an i+1-th surface, "ndi" and "vdi" represent the index of refraction and the Abbe number, respectively, of the material of the i-th optical element with respect to d-line. The angle of view is the half angle of view of the entire zoom lens system, and the image height is the maximum image height that determines the half angle of view. The overall length of the lens is the distance between the first lens surface and the image plane. The back focus BF is the distance between the last lens surface and the image plane. The field "aspherical surface data" shows aspherical surface coefficients when the aspherical surfaces are expressed by Expression 1 below:

$$x = \frac{\frac{h^2}{R}}{1 + \sqrt{1 - (1+k)\left(\frac{h}{R}\right)^2}} + A4h^2 + A6h^6 + A8h^8 + A10h^{10} + A12h^{12}$$ (Expression 1)

where x is the amount of displacement along the optical axis from the reference surface, h is the height in the direction perpendicular to the optical axis, R is the radius of a two-dimensional curved surface serving as a base, k is the conic constant, and An is the n-order aspherical surface coefficient.

Note that "E-Z" means "$10^{-z}$". The relationship between Conditional Expressions and the values in the numerical examples will be shown in Table.

Numerical Example 1

| | unit mm | | | | |
|---|---|---|---|---|---|
| | surface data | | | | |
| surface number | r | d | nd | vd | effective diameter |
| 1 | 123.227 | 2.00 | 1.90366 | 31.3 | 55.82 |
| 2 | 61.298 | 8.47 | 1.49700 | 81.5 | 54.23 |
| 3 | −579.136 | 0.10 | | | 54.03 |
| 4 | 60.082 | 6.39 | 1.60300 | 65.4 | 52.33 |
| 5 | 411.197 | (variable) | | | 51.72 |
| 6* | 2255.189 | 1.55 | 1.81600 | 46.6 | 32.83 |
| 7 | 17.837 | 6.60 | | | 25.17 |
| 8 | −76.484 | 1.20 | 1.81600 | 46.6 | 24.91 |
| 9 | 58.500 | 0.10 | | | 24.20 |
| 10 | 31.253 | 5.66 | 1.84666 | 23.9 | 24.16 |
| 11 | −56.963 | (variable) | | | 23.38 |
| 12 | −25.067 | 1.00 | 1.72916 | 54.7 | 17.34 |
| 13* | 269.260 | (variable) | | | 16.61 |
| 14 (aperture stop) | ∞ | 0.38 | | | 14.99 |
| 15 | 55.473 | 2.57 | 1.65160 | 58.5 | 15.36 |
| 16 | −44.336 | 0.10 | | | 15.53 |
| 17 | 33.951 | 3.64 | 1.48749 | 70.2 | 15.50 |
| 18 | −27.965 | 0.80 | 1.84666 | 23.9 | 15.22 |
| 19 | −128.204 | 1.42 | | | 15.18 |
| 20* | −60.556 | 1.00 | 1.67003 | 47.2 | 15.01 |
| 21 | 21.942 | 1.89 | 1.84666 | 23.9 | 15.04 |
| 22 | 48.455 | (variable) | | | 14.97 |
| 23 | 27.549 | 3.10 | 1.48749 | 70.2 | 21.03 |
| 24 | 149.861 | 0.15 | | | 21.12 |
| 25 | 31.779 | 5.33 | 1.49700 | 81.5 | 21.39 |
| 26 | −36.741 | 0.15 | | | 21.15 |
| 27* | −715.087 | 1.09 | 1.85400 | 40.4 | 20.43 |
| 28 | 24.341 | 2.10 | | | 19.84 |
| 29 | 83.257 | 3.36 | 1.83481 | 42.7 | 20.13 |
| 30 | −192.687 | (variable) | | | 20.49 |
| image plane | ∞ | | | | |

-continued unit mm aspherical surface data

6th surface

K = 0.00000e+000 A4 = 5.35897e-006 A6 = -4.91712e-009
A8 = 1.41283e-012 A10 = 5.95554e-017

13th surface

K = 0.00000e+000 A4 = -1.20124e-006 A6 = 1.03446e-008
A8 = -5.05143e-011 A10 = -1.11959e-012

20th surface

K = 0.00000e+000 A4 = 2.73999e-006 A6 = 6.72334e-009
A8 = 7.09581e-011 A10 = -1.27996e-012

27th surface

K = 0.00000e+000 A4 = -2.00157e-005 A6 = -2.42943e-008
A8 = 1.01958e-010 A10 = -3.98635e-013 data
zoom ratio 10.39

|  | wide angle | intermediate | telephoto |
|---|---|---|---|
| focal length | 18.60 | 60.40 | 193.27 |
| F number | 3.48 | 4.98 | 5.88 |
| angle of view | 36.27 | 12.74 | 4.04 |
| image height | 13.65 | 13.65 | 13.65 |
| overall length of the lens | 144.58 | 176.50 | 208.42 |
| BF | 38.09 | 63.96 | 77.06 |
| d5 | 1.18 | 30.51 | 56.25 |
| d11 | 4.80 | 5.63 | 11.04 |
| d13 | 28.60 | 12.17 | 2.46 |
| d22 | 11.77 | 4.09 | 1.47 |
| d30 | 38.09 | 63.96 | 77.06 | zoom lens unit data

| unit | initial surface | focal length |
|---|---|---|
| 1 | 1 | 98.70 |
| 2 | 6 | -51.17 |
| 3 | 12 | -31.41 |
| 4 | 14 | 53.76 |
| 5 | 23 | 44.36 |

Numerical Example 2 unit mm surface data

| surface number | r | d | nd | vd | effective diameter |
|---|---|---|---|---|---|
| 1 | 153.678 | 2.00 | 1.80610 | 33.3 | 52.55 |
| 2 | 53.100 | 9.17 | 1.49700 | 81.5 | 51.10 |
| 3 | -403.597 | 0.15 |  |  | 51.00 |
| 4 | 51.417 | 6.86 | 1.60311 | 60.6 | 49.88 |
| 5 | 312.464 | (variable) |  |  | 49.20 |
| 6* | 204.094 | 1.20 | 1.83481 | 42.7 | 28.12 |
| 7 | 16.037 | 5.88 |  |  | 22.19 |
| 8 | -60.806 | 0.90 | 1.77250 | 49.6 | 21.91 |
| 9 | 35.697 | 0.15 |  |  | 21.29 |
| 10 | 29.006 | 6.15 | 1.84666 | 23.9 | 21.38 |
| 11 | -34.331 | (variable) |  |  | 20.70 |
| 12* | -24.478 | 0.85 | 1.81600 | 46.6 | 17.85 |
| 13 | 6538.582 | (variable) |  |  | 17.28 |
| 14 (aperture stop) | ∞ | 0.59 |  |  | 15.41 |
| 15 | 46.351 | 3.05 | 1.61800 | 63.3 | 15.94 |
| 16 | -50.401 | 0.15 |  |  | 16.13 |
| 17 | 25.007 | 0.90 | 1.80518 | 25.4 | 16.09 |
| 18 | 14.752 | 4.42 | 1.48749 | 70.2 | 15.54 |
| 19 | -139.568 | (variable) |  |  | 15.29 |
| 20 | -44.487 | 0.70 | 1.71300 | 53.9 | 13.12 |
| 21 | 14.943 | 2.45 | 1.80610 | 33.3 | 13.09 |
| 22 | 60.441 | 2.66 |  |  | 13.01 |
| 23 | -21.786 | 1.10 | 1.83481 | 42.7 | 13.09 |
| 24 | -39.714 | (variable) |  |  | 13.77 |
| 25 | 49.770 | 5.22 | 1.49700 | 81.5 | 21.11 |
| 26 | -27.557 | 0.20 |  |  | 21.74 |
| 27 | 35.444 | 5.76 | 1.59240 | 68.3 | 22.11 |
| 28 | -62.293 | 1.30 | 1.83481 | 42.7 | 21.54 |
| 29 | 32.446 | 1.00 |  |  | 21.08 |
| 30 | 52.468 | 2.96 | 1.58313 | 59.4 | 21.21 |
| 31* | -102.383 | (variable) |  |  | 21.33 |
| image plane | ∞ |  |  |  |  | aspherical surface data

6th surface

K = 0.00000e+000 A4 = 1.80273e-006 A6 = 2.12313e-009
A8 = 4.28129e-011 A10 = 1.22741e-013

12th surface

K = 0.00000e+000 A4 = 7.39991e-006 A6 = 9.48141e-009
A8 = 2.10770e-011 A10 = 3.36651e-013

31st surface

K = 0.00000e+000 A4 = 1.94025e-005 A6 = 4.76423e-009
A8 = 3.78784e-010 A10 = -1.17111e-012 data
zoom ratio 10.39

|  | wide angle | intermediate | telephoto |
|---|---|---|---|
| focal length | 18.60 | 60.56 | 193.30 |
| F number | 3.45 | 4.86 | 5.88 |
| angle of view | 36.29 | 12.71 | 4.04 |
| image height | 13.66 | 13.66 | 13.66 |
| overall length of the lens | 147.70 | 181.75 | 215.80 |
| BF | 41.46 | 58.89 | 73.62 |
| d5 | 1.19 | 0.52 | 53.84 |
| d11 | 2.12 | 3.67 | 10.03 |
| d13 | 27.13 | 12.86 | 2.50 |
| d19 | 2.50 | 8.11 | 9.46 |
| d24 | 7.55 | 1.94 | 0.59 |
| d31 | 41.46 | 58.89 | 73.62 | zoom lens unit data

| unit | initial surface | focal length |
|---|---|---|
| 1 | 1 | 94.67 |
| 2 | 6 | -59.98 |
| 3 | 12 | -29.88 |
| 4 | 14 | 25.53 |
| 5 | 20 | -24.24 |
| 6 | 25 | 30.53 |

Numerical Example 3 unit mm surface data

| surface number | r | d | nd | vd | effective diameter |
|---|---|---|---|---|---|
| 1 | 114.376 | 2.00 | 1.84666 | 23.9 | 62.81 |
| 2 | 67.281 | 8.87 | 1.49700 | 81.5 | 60.83 |
| 3 | −9905.006 | 0.16 | | | 60.41 |
| 4 | 61.737 | 6.85 | 1.60300 | 65.4 | 57.38 |
| 5 | 282.710 | (variable) | | | 56.61 |
| 6* | 1062.760 | 0.08 | 1.51640 | 52.2 | 33.33 |
| 7 | 1138.379 | 1.60 | 1.81600 | 46.6 | 33.38 |
| 8 | 18.890 | 6.86 | | | 25.83 |
| 9 | −61.304 | 1.30 | 1.81600 | 46.6 | 25.55 |
| 10 | 116.595 | 0.16 | | | 25.07 |
| 11 | 38.764 | 5.62 | 1.84666 | 23.9 | 24.93 |
| 12 | −48.808 | (variable) | | | 24.20 |
| 13* | −32.757 | 1.00 | 1.80400 | 46.6 | 20.20 |
| 14 | 342.032 | (variable) | | | 19.36 |
| 15 (aperture stop) | ∞ | 0.40 | | | 18.56 |
| 16 | 62.340 | 2.84 | 1.69680 | 55.5 | 18.91 |
| 17 | −59.066 | 0.16 | | | 19.05 |
| 18 | 26.585 | 4.72 | 1.49700 | 81.5 | 18.94 |
| 19 | −33.996 | 0.90 | 1.84666 | 23.9 | 18.47 |
| 20 | −8042.681 | 3.35 | | | 18.22 |
| 21* | −116.750 | 0.90 | 1.80610 | 40.9 | 17.59 |
| 22 | 23.589 | 2.31 | 1.84666 | 23.9 | 17.43 |
| 23 | 70.619 | (variable) | | | 17.35 |
| 24* | 86.149 | 4.40 | 1.58313 | 59.4 | 19.46 |
| 25 | −27.204 | 8.29 | | | 20.25 |
| 26 | −3162.335 | 1.10 | 1.88300 | 40.8 | 21.67 |
| 27 | 35.096 | 1.28 | | | 21.89 |
| 28 | 51.894 | 2.29 | 1.60300 | 65.4 | 22.53 |
| 29 | 360.700 | (variable) | | | 22.90 |
| image plane | ∞ | | | | | aspherical surface data

6th surface

K = 0.00000e+000 A4 = 1.32728e−006 A6 = 3.19088e−009
A8 = −1.82287e−011 A10 = 2.42134e−014

13th surface

K = 0.00000e+000 A4 = 2.54686e−006 A6 = −1.85676e−010
A8 = −4.01493e−011 A10 = 4.15170e−013

21st surface

K = 0.00000e+000 A4 = 4.17108e−006 A6 = −3.87287e−008
A8 = 4.75576e−010 A10 = −2.00405e−012

24th surface

K = 0.00000e+000 A4 = −2.45890e−005 A6 = 5.88756e−008
A8 = −6.10080e−010 A10 = 2.33946e−012 data
zoom ratio 6.69

| | wide angle | intermediate | telephoto |
|---|---|---|---|
| focal length | 28.90 | 76.87 | 193.28 |
| F number | 3.60 | 5.27 | 5.88 |
| angle of view | 36.82 | 15.72 | 6.39 |
| image height | 21.64 | 21.64 | 21.64 |
| overall length of the lens | 144.56 | 176.58 | 208.59 |
| BF | 38.00 | 66.95 | 76.98 |
| d5 | 1.06 | 23.02 | 48.69 |
| d12 | 2.86 | 4.53 | 11.19 |
| d14 | 26.98 | 12.08 | 2.52 |
| d23 | 8.26 | 2.60 | 1.81 |
| d29 | 38.00 | 66.95 | 76.98 | zoom lens unit data

| unit | initial surface | focal length |
|---|---|---|
| 1 | 1 | 101.29 |
| 2 | 6 | −70.55 |
| 3 | 13 | −37.14 |
| 4 | 15 | 48.73 |
| 5 | 24 | 61.19 |

TABLE

| Conditional Expression | First Embodiment | Second Embodiment | Third Embodiment |
|---|---|---|---|
| (1) | 5.53 | 7.44 | 6.79 |
| (2) | 4.41 | 2.52 | 3.30 |
| (3) | 0.16 | 0.15 | 0.19 |

Referring to FIG. 10, an embodiment in which the zoom lens of the present invention is used as an image pick-up optical system will be described. FIG. 10 shows an SLR camera body 10 and an interchangeable lens 11 having the zoom lens of the present invention.

FIG. 10 also shows a photosensitive surface 12 of a silver-halide film, on which an image of an object obtained through the interchangeable lens 11 is recorded, or of a solid-state image pick-up device (photoelectric conversion element) that receives an image of an object, a finder optical system 13 through which an image of the object from the interchangeable lens 11 is observed, and a rotating quick-return mirror 14 that transmits the image of the object from the interchangeable lens 11 to the photosensitive surface 12 and the finder optical system 13 in a switchable manner. When observing the image of the object through the finder, the image of the object formed on a focusing screen 15 via the quick-return mirror 14 is erected by a pentaprism 16 and is magnified by an eyepiece optical system 17.

When capturing an image, the quick-return mirror 14 is rotated in the direction indicated by the arrow, and an image of the object is formed on the photosensitive surface 12 of the recording unit and is recorded. By applying the zoom lens of the present invention to optical devices for SLR cameras, such as interchangeable lenses, optical devices having a high optical performance can be achieved. The present invention may also be applied to SLR cameras with no quick-return mirror, i.e., mirror-less SLR cameras, and to video cameras.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-240225, filed Nov. 1, 2011, which is hereby incorporated by reference herein in its entirety.

What is claimed is:

1. A zoom lens comprising, in order from an object side to an image side:
   a first lens unit having a positive refractive power;
   a second lens unit having a negative refractive power;

a third lens unit having a negative refractive power; and
a rear lens group including a plurality of lens units and having a positive refractive power as a whole,
wherein the rear lens group consists of, in order from an object side to an image side:
  a fourth lens unit having a positive refractive power, and
  a fifth lens unit having a positive refractive power;
  or
  a fourth lens unit having a positive refractive power,
  a fifth lens unit having a negative refractive power, and
  a sixth lens unit having a positive refractive power;
wherein distances between adjacent lens units of the rear lens group are changed during zooming,
wherein the first lens unit moves during zooming, and the third lens unit moves during focusing,
wherein conditions $3.7 < |f12w/fw| < 8.5$ and $1.0 < |f12t/ft| < 5.5$ are satisfied, where fw is a focal length of the zoom lens at a wide-angle end, ft is a focal length of the zoom lens at a telephoto end, $f12w$ is a combined focal length of the first and second lens units at the wide-angle end, and $f12t$ is a combined focal length of the first and second lens units at the telephoto end, and
wherein $f12w$ is calculated from $1/f12w = 1/f1 + 1/f2 - dw/(f1 \cdot f2)$, and $f12t$ is calculated from $1/f12t = 1/f1 + 1/f2 - dt/(f1 \cdot f2)$, where f1 is a focal length of the first lens unit, f2 is a focal length of the second lens unit, dw is a distance between a principal point of the first lens unit and a principal point of the second lens unit at the wide-angle end, and dt is a distance between a principal point of the first lens unit and a principal point of the second lens unit at the telephoto end.

2. The zoom lens according to claim 1, wherein a condition $0.1 < |f3/ft| < 0.6$ is satisfied, where f3 is a focal length of the third lens unit.

3. The zoom lens according to claim 1, wherein the third lens unit includes a single lens or a cemented lens composed of a plurality of lenses joined together.

4. The zoom lens according to claim 1, wherein the third lens unit includes an aspherical lens surface.

5. The zoom lens according to claim 1,
wherein the entirety of the fourth lens unit or a lens subunit thereof having a negative refractive power is moved in a direction having a component perpendicular to an optical axis to move an image formation position in the direction perpendicular to the optical axis.

6. The zoom lens according to claim 1,
wherein the entirety of the fifth lens unit or a lens subunit thereof having a negative refractive power is moved in a direction having a component perpendicular to an optical axis to move an image formation position in the direction perpendicular to the optical axis.

7. An image pick-up apparatus comprising:
a zoom lens; and
a solid-state image pick-up device that receives light from an image formed by the zoom lens,
wherein the zoom lens comprises in order from an object side to an image side:
  a first lens unit having a positive refractive power;
  a second lens unit having a negative refractive power;
  a third lens unit having a negative refractive power; and
  a rear lens group including a plurality of lens units and having a positive refractive power as a whole,
wherein the rear lens group consists of, in order from an object side to an image side:
  a fourth lens unit having a positive refractive power, and
  a fifth lens unit having a positive refractive power;
  or
  a fourth lens unit having a positive refractive power,
  a fifth lens unit having a negative refractive power, and
  a sixth lens unit having a positive refractive power;
wherein distances between adjacent lens units of the rear lens group are changed during zooming,
wherein the first lens unit moves during zooming, and the third lens unit moves during focusing,
wherein conditions $3.7 < |f12w/fw| < 8.5$ and $1.0 < |f12t/ft| < 5.5$ are satisfied, where fw is a focal length of the zoom lens at a wide-angle end, ft is a focal length of the zoom lens at a telephoto end, $f12w$ is a combined focal length of the first and second lens units at the wide-angle end, and $f12t$ is a combined focal length of the first and second lens units at the telephoto end, and
wherein $f12w$ is calculated from $1/f12w = 1/f1 + 1/f2 - dw/(f1 \cdot f2)$, and $f12t$ is calculated from $1/f12t = 1/f1 + 1/f2 - dt/(f1 \cdot f2)$, where f1 is a focal length of the first lens unit, f2 is a focal length of the second lens unit, dw is a distance between a principal point of the first lens unit and a principal point of the second lens unit at the wide-angle end, and dt is a distance between a principal point of the first lens unit and a principal point of the second lens unit at the telephoto end.

* * * * *